US 6,826,579 B1

(12) United States Patent
Leymann et al.

(10) Patent No.: US 6,826,579 B1
(45) Date of Patent: Nov. 30, 2004

(54) GENERATING EVENT-CONDITION-ACTION RULES FROM PROCESS MODELS

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/498,835

(22) Filed: Feb. 4, 2000

(30) Foreign Application Priority Data

Feb. 6, 1999 (EP) .............................................. 99102337

(51) Int. Cl.[7] .................................................. G06F 9/44
(52) U.S. Cl. ....................... 707/131; 717/132; 717/103
(58) Field of Search ............................. 705/1, 7; 707/2, 707/104, 100, 131, 132, 103

(56) References Cited

U.S. PATENT DOCUMENTS

| | | | | |
|---|---|---|---|---|
| 5,499,371 A | * | 3/1996 | Henninger et al. | 717/108 |
| 5,734,837 A | * | 3/1998 | Flores et al. | 705/7 |
| 5,802,527 A | * | 9/1998 | Brechtel et al. | 707/200 |
| 5,926,819 A | * | 7/1999 | Doo et al. | |
| 5,937,410 A | * | 8/1999 | Shen | 707/103 R |
| 6,182,274 B1 | * | 1/2001 | Lau | 717/104 |
| 6,199,195 B1 | * | 3/2001 | Goodwin et al. | 717/104 |
| 6,212,672 B1 | * | 4/2001 | Keller et al. | 717/104 |
| 6,308,224 B1 | * | 10/2001 | Leymann et al. | |

FOREIGN PATENT DOCUMENTS

DK   WO 99102337.5   *   8/1999

OTHER PUBLICATIONS www.rational.com as archived on Apr. 22, 1999.*

Rational Rose Software Product from demo CD "Inside the UML" Copyright 1998.*

Microsoft computer Dictionary, 1994, pp. 32—Definition of autmata theory and automated office.*

The Computer Glossary, 1995, pp. 23—Definition of automation.*

* cited by examiner

*Primary Examiner*—Tariq R. Hafiz
*Assistant Examiner*—Eric Todd Shaffer
(74) *Attorney, Agent, or Firm*—Rafael Perez-Pineiro

(57) ABSTRACT

A computerized method for automatically transforming the process model of a workflow-management-system into trigger-specifications executable within a trigger system. The process model comprises at least one source activity S, a target activity T and a control connector defining a potential control flow from said source activity to said target activity associated with a transition condition P. The source activity S is transformed into a trigger event. The trigger-event, if raised at run-time, indicates to said trigger system that an instance of said source activity has been terminated. The control connector is transformed into a trigger condition, causing said trigger system at run-time, once said trigger event has been raised, to evaluate the truth value of said transition condition. Furthermore said target activity is transformed into a trigger action causing said trigger system at run-time, in case said trigger condition evaluates to TRUE, to start an instance of said target activity.

14 Claims, 2 Drawing Sheets

```
        CREATE TRIGGER A_p_B    401
        AFTER INSERT ON T2          [≅ termination event]
        REFERENCING NEW AS N
        FOR EACH ROW MODE DB2SQL    402        403
        WHEN VALUES( evaluate(P,N.parms) ) = 1 [≅ condition]
        BEGIN ATOMIC            [≅ action block]
            VALUES( start(B) )   404
405
         INSERT INTO T1 VALUES( ... )   [≅ prepares signaling of new event]
        END
```

GENERATING EVENT-CONDITION-ACTION RULES FROM PROCESS MODELS

FIELD OF THE INVENTION

The present invention relates to an approach of automatically transforming the process-model of a workflow-management-system into trigger-specifications executable within a trigger-system.

BACKGROUND OF THE INVENTION

A new area of technology with increasing importance is the domain of Workflow-Management-Systems (WFMS). WFMS support the modeling and execution of business processes. Business processes executed within a WFMS environment control which piece of work of a network of pieces of work will be performed by whom and which resources are exploited for this work. The individual pieces of work might be distributed across a multitude of different computer systems connected by some type of network.

The product "IBM MQSeries Workflow" (also called FlowMark) represents such a typical modern, sophisticated, and powerful workflow management system. It supports the modeling of business processes as a network of activities. This network of activities, the process model, is constructed as a directed, acyclic, weighted, colored graph. The nodes of the graph represent the activities or workitems which are performed. The edges of the graph, the control connectors, describe the potential sequence of execution of the activities. Definition of the process graph is via the IBM MQSeries Workflow Definition Language (FDL) or the built-in graphical editor. The runtime component of the workflow manager interprets the process graph and distributes the execution of activities to the right person at the right place, e.g. by assigning tasks to a work list according to the respective person, wherein said work list is stored as digital data within said workflow or process management computer system.

Another area of technology is that of trigger systems. The paradigm for execution of activities within these systems is based on that of a trigger. A trigger is a rule defined to the trigger system specifying, in case of a raised event and in case an associated condition evaluates to TRUE, a certain action is to be started by the trigger system. The trigger system comprises a set of such triggers. It is continually monitoring raised events and determines the corresponding triggers, which then are executed ("fired") and may result in initiation of a trigger action. An action may raise further events during its execution, thereby inducing further activity. Based on this mimic, effective work is processed by a trigger system.

Triggers can be understood to often reflect business rules, and business processes may be seen as collections of business rules. According to this approach business processes are collections of triggers.

Triggers have been introduced for instance to help managing consistency in database systems. Originally, it has been described as an abstraction of (internal) services to be implemented by a Database management System (DBMS) to ensure consistency of database manipulations via transactions. But this scope has been extended to manage long running transactions in non-traditional exploitations of DBMS (refer for instance to A. Kotz, *Triggermechanismen in Datenbanken*, Springer, 1989); DBMSs providing general purpose trigger environments are often referred to as active DBMSs. One example of an active database is IBM's DB2 Universal Database (UDB). Today, most commercial relational DBMS provide restricted variants of triggers to allow the enforcement of business rules within transactions, and consequently, triggers are foreseen for SQL3 standardization. Though trigger systems provide an effective implementation environment in many application fields they are accompanied from a global point of view with deficiencies in terms of clarity—with a growing number of triggers the difficulties are increasing to understand the interrelation of the various actions responsive to trigger events. On the other hand process models of WFMS are capable to provide exactly this global picture precisely defining and showing which activity is followed by which other activity under which conditions.

What would be desirable is to model and define business processes completely in terms of and based on WEMS technology but, on the other hand, open the option to use the technology of trigger systems as a mere implementation environment.

It is an objective of the invention to automatically transform the process models of a Workflow-Management-System (WFMS) into trigger specifications automatically generating an executable implementation of the business processes modeled by said process models.

SUMMARY OF THE INVENTION

The objectives of the invention are solved by the invention comprising a computerized method for automatically transforming the process model of a workflow-management-system into trigger-specifications executable within a trigger system. The process model comprises at least one source activity S, a target activity T, and a control connector defining a potential control flow from said source activity to said target activity associated with a transition condition P. According to the proposed teaching, said source activity S is transformed into a trigger event. The trigger-event, if raised at run-time, indicates to said trigger system that an instance of said source activity has been terminated. Moreover, said control connector is transformed into a trigger condition, causing said trigger system at run-time, once said trigger event has been raised, to evaluate the truth value of said transition condition. Furthermore, said target activity is transformed into a trigger action causing said trigger system at run-time, in case said trigger condition evaluates to TRUE, to start an instance of said target activity.

The current invention provides a combination of WFMS technology and trigger technology. The current invention teaches how to map control flows of business process models to ECA rules. The interpretation of the generated ECA rules themselves can be implemented in a variety of ways, e.g. in active database systems, agent systems, or publish/subscribe environments. Consequently, the invention can be deployed for implementing a workflow system based on a multitude of different technologies. The invention teaches an approach to model and define business processes completely in terms of, and based on, WEMS technology; but, on the other hand, open the option to use, as a mere implementation environment, the technology of trigger systems by automatically generating trigger specifications which are directly executable by the trigger system.

BRIEF DESCRIPTION OF THE DRAWINGS

The invention will now be described in further detail with specific reference to the appended figures wherein.

DESCRIPTION OF THE PREFERRED EMBODIMENT

Figure 1:
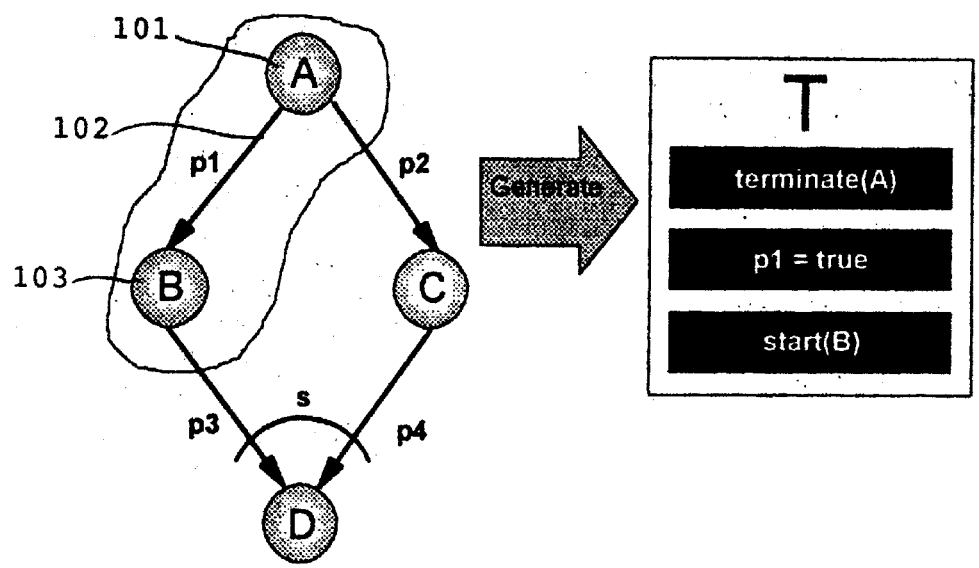
FIG. 1 is a diagram reflecting the fundamental transformation approach transforming each individual construct consisting of a source activity, a target activity and a control connector connecting these activities into a separate trigger.

The current invention is illustrated based on IBM's MQSeries Workflow workflow management system. Of course any other WEMS could be used instead. Furthermore the current teaching applies also to any other type of system which offers WFMS functionalities not as a separate WFMS but within some other type of system.

Moreover, the preferred embodiment which is based on DB2 trigger technology could be readily implemented within other active databases or other trigger systems without deviating from the invention principles.

The following is a short outline on the basic concepts of a workflow management system based on IBM's MQSeries Workflow WFMS:

From an enterprise point of view the management of business processes is becoming increasingly important: business process, or process for short, controls which piece of work will be performed by whom and which resources are exploited for this work, i.e. a business process describes how an enterprise will achieve its business goals. A WFMS may support both the modeling of business processes and their execution.

Modeling of a business process as a syntactical unit in a way that is directly supported by a software system is extremely desirable. Moreover, the software system can also work as an interpreter basically getting a model as input. The model, called a process model or workflow model, can then be instantiated and the individual sequence of work steps, depending on the context of the instantiation of the model, can be determined. A model of a business process can be perceived as a template for a class of similar processes performed within an enterprise; such that it is a schema describing all possible execution variants of a particular kind of business process. An instance of such a model and its interpretation represents an individual process, i.e. a concrete, context dependent execution of a variant prescribed by the model. A WFMSs facilitates the management of business processes. It provides a means to describe models of business processes (build time) and it drives business processes based on an associated model (run time). The meta model of IBM's WFMS MQSeries Workflow, including the syntactical elements provided for describing business process models, and the meaning and interpretation of these syntactical elements, is described next.

A process model is a complete representation of a process, comprising a process diagram and the settings that define the logic behind the components of the diagram. Important components of a MQSeries Workflow process model (not all of which are detailed below) include:

Processes
Activities
Blocks
Control Flows
Connectors
Data Containers
Data Structures
Conditions
Programs
Staff Activities are the fundamental elements of the meta model. An activity represents a business action that is, from a certain perspective, a semantic entity of its own.

An MQSeries Workflow process model consists of the following types of activities:

Program activity: One which has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: An activity which has a (sub-)process assigned to perform it. The process is invoked when the activity is started. A process activity represents a way to reuse a set of activities that are common to different processes. Output from the process can be used in the exit condition for the process activity and for the transition conditions to other activities.

The flow of control, (i.e. the control flow through a running process) determines the sequence in which activities are executed. The MQSeries Workflow workflow manager navigates a path through the process that is determined by the evaluation to TRUE of start conditions, exit conditions, and transition conditions.

The results, that are in general produced by the work represented by an activity, are put into an output container, which is associated with each activity. Since an activity will, in general, require access to output containers of other activities, each activity is associated in addition with an input container. At run time, the actual values for the formal parameters building the input container of an activity represent the actual context of an instance of the activity. Each data container is defined by a data structure. A data structure is an ordered list of variables, called members, that have a name and a data type. Data connectors represent the transfer of data from output containers to input containers. When a data connector joins an output container with an input container, and the data structures of the two containers match exactly, the MQSeries Workflow workflow manager maps the data automatically.

Connectors link activities in a process model. Using connectors, one defines the sequence of activities and the transmission of data between activities. Since activities might not be executed arbitrarily, they are bound together via control connectors. A control connector might be perceived as a directed edge between two activities; such that the activity at the connector's end point cannot start before the activity at the start point of the connector has finished (successfully). Control connectors thus model the potential flow of control within a business process model. Default connectors specify where control should flow when the transition condition, of no other control connector leaving an activity, evaluates to TRUE. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Conditions are the means by which it is possible to specify the flow of control in a process. In MQSeries Workflow process models logical expressions can be defined that are evaluated by MQSeries Workflow at runtime to determine when an activity may start, end, and pass control to the next activity. Start conditions are conditions that determine when an activity with incoming control connectors can start. The start condition may specify that all incoming control connectors must evaluate to TRUE, or it may specify that at least one of them must evaluate to TRUE. Whatever the start condition is, all incoming connectors must be evaluated before the activity can start. If an activity has no incoming control connectors, it becomes ready when the process or block containing it starts. In addition, a Boolean expression called transition condition is associated with each control connector. Parameters from output containers of activities having already produced their results are followed as parameters referenced in transition conditions. When, at run time, an activity terminates successfully, all control connectors leaving this activity are determined and the truth value of the associated transition conditions is computed based on the actual values of their parameters. Only the end points of control connectors for which the transition conditions evaluated to TRUE are considered as activities that might be executed based on the actual context of the business process. Transition conditions thus model the context dependent actual flow of control within a business process (i.e. an instance of a model). Business processes encompass long running activities in general and such activities need to be allowed to become interrupted. Thus, termination of an activity does not necessarily indicate that the associated task has been finished successfully. In order to allow the measurement of successfulness of the work performed by an activity, a Boolean expression called exit condition is associated with each activity. Only the activities for which the exit condition evaluated to TRUE in the actual context are treated as successfully terminated. For determination of the actual control flow, only the successfully terminated activities are considered. Thus, the logical expression of an exit condition, if specified, must evaluate to TRUE for control to pass from an activity or block.

Process definition includes modeling of activities, control connectors between the activities, input/output container, and data connectors. A process is represented as a directed acyclic graph with the activities as nodes and the control/data connectors as the edges of the graph. The graph is manipulated via a built-in graphic editor. The data containers are specified as named data structures. These data structures themselves are specified via the DataStructureDefinition facility. Program activities are implemented through programs. The programs are registered via the Program Definition facility. Blocks contain the same constructs as processes, such as activities, control connectors etc. They are, however, not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows construction of a process through permanent refinement of activities into program and process activities (top-down), but also the building of a process out of a set of existing processes (bottom-up).

All data structures used as templates for the containers of activities and processes are defined via the Data Structure Definition Facility. Data Structures are names and are defined in terms of elementary data types, such as float, integer, or string, and references to existing data structures. Managing data structures as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

A trigger is a software artifact which allows a software system to dynamically react to stimuli which are not foreseen by the creators of the software system. A trigger basically consists of three components, namely an event, a condition and an action. These three components are interpreted as a rule, a so-called event-condition-action rule or ECA rule for short. An event is the description of the stimuli; the condition is a predicate restricting the context in which the stimuli is relevant; and the action is the prescription of a reaction on relevant stimuli. The "invention" of triggers is often associated with research on IBM's System/R.

The semantics of an ECA rule are as follows: Whenever the occurrence of an event is signaled to the software system, the associated condition is evaluated and, if satisfied, the corresponding action is performed (i.e. in case the event occurs and the condition evaluates to TRUE, the trigger will "fire" the action). Events, conditions and actions have parameters assigned to them, where the event parameters are mainly used to provide the parameters needed to evaluate the condition and to pass data to the action. Raising the event encompasses the provision of this data A simple notation to define triggers is as follows:

| TRIGGER t = | | |
| --- | --- | --- |
| ON | e $(p_1, \ldots p_n)$ | [= Event] |
| IF | c $(q_1, \ldots q_k)$ | [= Condition] |
| DO | a $(r_1, \ldots r_m)$ | [= Action] |

Here, $\{p_i, \ldots, p_n\}$ denote: the parameters which are passed into the system when raising the event named e; $\{q_1, \ldots, q_k\} \subseteq \{p_1, \ldots p_n\}$ are the parameters which are needed to evaluate the condition named c; and $\{r_1, \ldots, r_m\} \subseteq \{p_1, \ldots p_n\}$ are the parameters being passed to the action named a. Triggers are often denoted as t=(e,c,a), for brevity.

Today's commercial production workflow engines are not implemented on top of triggering systems. An important reason for this is the complexity of the resulting process models, i.e. the complexity of the set of triggers controlling the trigger system's behavior. The current invention exactly addresses this problem. To improve and speed up the implementation of a WFMS based and implemented within a trigger system, the current teaching suggests the usage of process models known from today's production workflow engines and suggests the automatic generation of triggers out of such process models which then implement the process models. The issue of complexity (in the sense of intelligibility) is reduced to that of the subject process models and the corresponding implementation within a trigger system can be generated automatically.

Most production workflow engines today support a meta model which is based on directed graphs. The "interface 1" standard of the workflow management coalition WfMC reflects this. Commercially available products, like IBM's MQSeries Workflow, implement these standards at least partially. The following describes how such graphs can be transformed into ECA rules.

For this purpose, first a more "basic" solution is given which maps edges independent from each other to triggers. The basic approach ignores possible semantics with respect to synchronization of work. Second, a transformation is described which does consider synchronization issues in addition. Since only a few WFMS deal with the synchronization of work explicitly, both of the maps are relevant.

The Fundamental Transformation—Ignoring Synchronization

Referring to FIG. 1, the fundamental transformation approach is depicted. The basic idea is to transform each individual construct, consisting of a source activity, a target activity and a control connector connecting these activities, into a separate trigger. The left side of FIG. 1 reflects part of a process model to be transformed into a trigger. Let (S,p,T) be an edge, for instance connector (102), of a directed graph specifying the control flow between the source activity S, for instance node A (101), and the target activity T, for instance node B (103), where p denotes the condition under which the transition prescribed by the edge will take place (for instance transition condition p1. (102) in FIG. 1). The central idea is to transform this edge into a trigger according to the following rule:

1. The source activity S corresponds to the termination event of this activity. This event is denoted by TERMINATE(S).
2. The target activity T corresponds to the start action of this activity. This action is denoted by START(T).
3. The transition condition p is transformed into the trigger's condition.

The abstract description of the fundamental transformation is as follows:

Let G=(N,E) be a directed graph describing the control flow of a business process. N is the set of activities, E ⊆N×N×C is the set of control connectors between the activities and C is the set of predicates (e.g., transition conditions) (x denoting the Cartesian product). Then, an element (S,p,T)∈E is transformed into the following trigger:

---
TRIGGER S_p_T = ON TERMINATE (S)
                IF p
                DO START (T)
---

In FIG. 1, the edge (A,p1,B) (101, 102, 103) is transformed based on the fundamental transformation into the trigger A_p1_B=(TERMINATE(A), p1, START(B)), which is visualized on the right side of FIG. 1.

The Enhanced Transformation—Considering Synchronization

Some workflow engines deal with the issue of synchronizing parallel paths of work in a process model. For this purpose, special behavior is assumed at nodes which have more than one incoming control connector, called a join node. Such a node will become startable when all incoming control connectors have been traversed and its start condition is met. The start condition is a Boolean condition in the transition conditions of the incoming control connectors. Typically two situations may occur: either the target-activity represented by the join node may be started in case either one of said transition-conditions of said incoming control connectors evaluates to TRUE; or the target-activity may be started in case all of said transition-conditions of said incoming control connector are TRUE. By enhancing step (3) of above fundamental transformation this behavior can be reflected.

Figure 2:
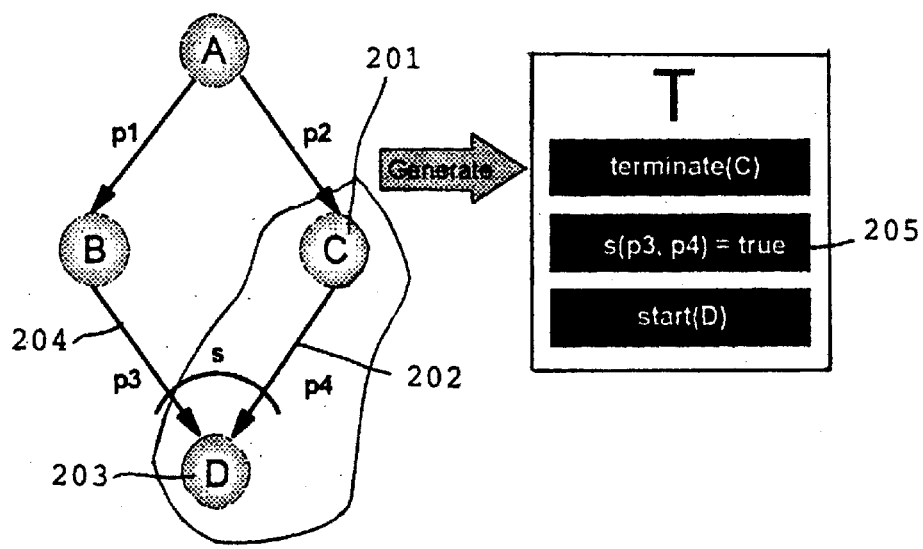
FIG. 2 is a diagram reflecting the enhanced transformation approach dealing with the issue of synchronizing parallel paths of work in a process model.

Referring to FIG. 2 the enhanced transformation approach is depicted. The additional idea is to treat the case of a join node as a target activity by an enhanced transformation, such that, when translating a source node, control connector, target activity construct, the generated trigger condition incorporates not only the transition conditions of that particular control connector, but also includes all transition conditions of further control connectors entering this particular target activity. The left side of FIG. 2 reflects part of a process model to be transformed into a trigger comprising a join node (203) being the target of the source node (201) connected with the control connector (202), together forming the particular construct to be transformed into a generated trigger. Therefore, if it is further assumed that the target activity is the target of multiple control connectors emerging from the same or different source activity, then let (S,p,T) be an edge, for instance connector (202), of a directed graph specifying the control flow between the source activity S, for instance activity (201), and the target activity T, for instance activity (203), where p denotes the condition under which the transition prescribed by the edge will take place. The central idea is to transform this edge into a trigger as follows:

1. The source activity S corresponds to the termination event of this activity. This event is denoted by TERMINATE(S).
2. The target activity T corresponds to the start action of this activity. This action is denoted by START(T).
3. The start condition J of the target activity T is transformed into the trigger's condition having the transition conditions of all incoming edges as parameters, for example:
   i. If the target activity is not a join node (see FIG. 1) the trigger's condition is simply identical to the transition condition of that particular edge.
   ii. If the target activity is a join node (see FIG. 2) the trigger's condition is (P3 OR P4), or (P3 AND P4), for example—or s(p2,p3) in a more abstract notation.

The abstract description of the enhanced transformation is as follows:

Let G=(N,E, Φ) be a directed graph describing the control flow of a business process. N is the set of activities, E ⊆N×N×C is the set of control connectors between the activities, C is the set of predicates (e.g. transition conditions), and Φ:N→C is the map associating the corresponding join condition with each activity. Then, an element (S,p,T)∈E is transformed into the following trigger:

---
TRIGGER S_p_T = ON TERMINATE (S)
                IF Φ (T) (T$^{\leftarrow}$)
                DO START (T)
--- where T$^{\leftarrow}$ denotes the set of transition conditions of all edges pointing to T, i.e.

$$T^{\leftarrow}:=\{p\in C | \exists A\in N:(A,p,T)\in E\}.$$

and Φ(T) (T$^{\leftarrow}$) denotes the concrete conditions for the target activity T based on the set T$^{\leftarrow}$ of all control connectors pointing to T.

In FIG. 2 the node D (203) is a join node with $D^{\leftarrow}=\{p3, p4\}$, and it is assumed that D's join condition is p3 OR p4. Then, the generated triggers are B_p3_D=(TERMINATE (B), p3 OR p4, START(D)) and C_p4_D=(TERMINATE (C), p3 OR p4, START(D)), which is visualized on the right side of FIG. 2. It is important to note that not only the condition (203) but also all further conditions of additional incoming control connector (control connector (204) in the current case) are combined, thereby forming an overall logical predicate which represents the trigger condition (205) of the generated trigger.

Storing Truth Values For Join Conditions

The enhanced transformation requires more sophistication at the implementation level. This is because join nodes typically synchronize parallel work. Thus, the source activities of edges pointing to a target activity which is a join node will terminate at different points in time, i.e. the corresponding TERMINATE( ) events will be not be signaled at the same time. As a result, the condition of a trigger associated with a join node will not be evaluated to TRUE, in general, because only the truth value of one incoming transition condition will be available at a given (signaling-) time and the other transition condition are "unknown" (because they have already been "forgotten" or they have not been computed yet).

Thus, the overall environment must be able to maintain historic information about events or truth values of conditions, respectively. The natural way to achieve this is to enhance the implementation of the routine evaluating the condition of triggers. This routine is adapted to maintain information about already signaled events (e.g. mainly the parameters of the event). Whenever the evaluation routine has to evaluate a composite condition, it accesses this information when necessary (i.e. when the truth value cannot be determined based on the parameters of the actually signaled event) and uses it as the basis for evaluation of the trigger condition.

The overall result is that the transformation maintains the synchronization behavior as prescribed in the operational semantics of workflow engines.

Considering Data Flows

The current invention is also capable of dealing with data flows as specified in business processes. The parameters $\{p_1 \ldots p_n\}$ of the event TERMINATE(S) consist of all parameters of all transition conditions of edges pointing to target activity T, as well as the input container of the target activity T, i.e.

$$\{p_1, \ldots, p_n\} = \bigcup_{c \in T^{\leftarrow}} t(c) \cup t(T),$$

where i(X) denotes the input container of X. The parameters $\{q_1, \ldots, q_k\}$ of the trigger condition consist of all parameters of all transition conditions of edges pointing to T, i.e.

$$\{q_1, \ldots, q_k\} = \bigcup_{c \in T^{\leftarrow}} l(c).$$

The parameters $\{r_1, \ldots r_m\}$ of the action START (T) consist of the input container of T, i.e. $\{r_1, \ldots, r_m\}=i(T)$. Thus, the enhanced transformation also considering data flows results in the generation of the following trigger:

$$\text{TRIGGER } S\_p\_T = \text{ON TERMINATE }(S) \bigcup_{c \in T^{\leftarrow}} l(c) \cup l(T)$$

$$\text{IF} \quad \Phi(T)(T^{\leftarrow})) \bigcup_{c \in T^{\leftarrow}} l(c)$$

$$\text{DO START }(T)i(T)$$

Standard state of the art techniques can be exploited to actually provide the required parameters to the trigger environment. An advantageous approach is for example the following:

The system component of the overall environment that signals the event TERMINATE(S) materializes all of the parameters $\{p_1, \ldots, p_n\}$ and passes the information to the triggering environment. The trigger system then may access these data elements by a certain handle or API call or other accessing means.

The task of materializing all required parameters is split up:

The evaluation routine of the trigger conditions materializes the input data for these conditions itself.

The transformation is modified to produce, for the target node, a composed action. The first component of the composed action is MATERIALIZE(T) which materializes the input container of T and passes it to the proper START(T) action, which is the second component of the composed action. The general MATERIALIZE(T) implementation can be provided as part of the environment.

It has to be noted, that some workflow engines provide the materialization of the input container as part of the START (S) service. Thus, in case an embodiment of the invention exploits existing APIs of workflow systems from within the trigger environment, the latter modification is not needed.

Further Embodiment Features Based Upon DB2 UDB Active Database

As an example of an embodiment of the trigger environment, the active database features of DB2 UDB may be exploited. In such an embodiment, the generated action may be a composed action consisting especially of the START( ) action to start the target activity and a new action signaling the termination of the target activity (SIGNALTERMINATION( )) (301) as visualized in FIG. 3. Execution of this termination request by the trigger environment would result in a tuple being inserted into a system table T1 (302) indicating the termination of the target activity (303). Table T1 can be perceived as a log of terminated activities awaiting further navigation.

Table T1 is processed by a special program PGM X (304) in a loop: PGM X removes one tuple at a time from table T1 and creates a corresponding new tuple in a second system table T2 (305) (i.e. PGM X deletes a tuple from T1 and inserts a tuple into T2 in a single transaction). The tuple inserted into table T2 represents the proper signal of the termination of an activity (i.e. the TERMINATE( ) event) and consequently triggers the processing sketched before; i.e. raising the signal, that target activity B (303) has been terminated, which would cause the trigger system to search for a further trigger corresponding to this event, which in turn would be processed by the trigger system as the next step. PGM X could compute all required parameters of the event and put it in a column of table T2. But computing these parameters could also be done from within the trigger action by adding a separate MATERIALIZE( ) component to the generated action. Similarly, the function evaluating the trigger condition (see below) must then be extended to materialize all required parameters. Conceptually, tables T1 and T2 can also be merged into a single table and a table flag could be used to distinguish table records which indicate a record status of (a) just termination of an activity or (b) the final termination event and readiness for dispatching (for instance after completion of all materialization processing making the materialized data available in the table). Of importance is only that PGM X determines all required parameters, inserting a table record into table T2 comprising all the parameters for a termination signal dispatchable by the trigger system.

Figures 3, 4:
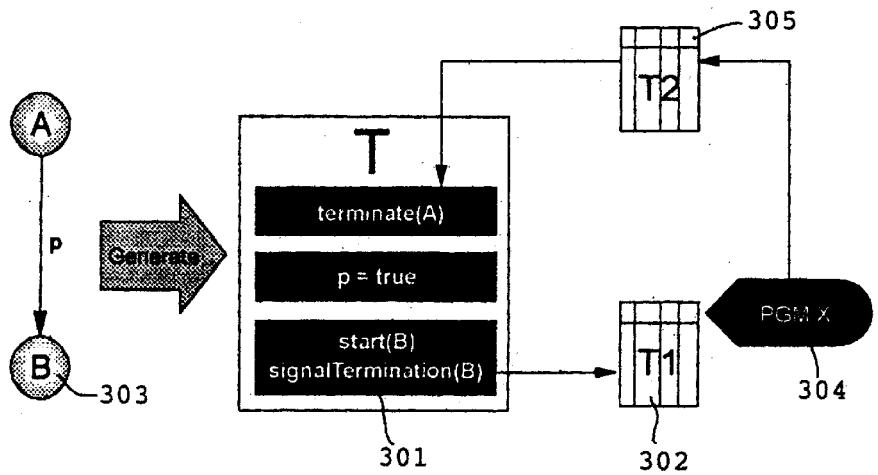
FIG. 3 visualizes an embodiment of the transformation process wherein the trigger action in addition to the START( ) action also comprises a further action (SIGNALTERMINATION( )) signaling the termination of the target activity.
FIG. 4 depicts the generated trigger specification for the example of FIG. 3 following the DB2 UDB syntax for a particular embodiment according to the current invention.

The generated trigger specification for the example of FIG. 3 following the DB2 UDB syntax and of above particular embodiment is depicted in FIG. 4.

The various clauses of the trigger definition should be clear based on what has been said before. Processing of the raised trigger event is started once the termination event is inserted into table T2 (401) also providing all materialized parameters.

In the next step of trigger processing, the trigger condition is evaluated (402). The VALUE clause is exploited to invoke a user defined function for evaluation purposes. For example, the function EVALUATE( ) has at least the two parameters P (i.e. the transition condition) and N.parms (assuming that T2 has a column called PARMS with all of the required parameters for the trigger condition and PARMS serving as a handle for accessing the data). The next steps within the trigger processing are executed only if the transition condition (402) evaluates to true (403). Again, based on the VALUE clause, the corresponding target activity START(B) is invoked by the trigger system. After its completion, the termination request (405) inserts a corresponding termination record tuple into the system table T1 indicating termination of the activity and indicating that it is awaiting the navigation which will finally result in the signaling of a new event. Basically the termination request (405) is a specific implementation of the approach discussed above based upon the SIGNALTERMINATION( ) call.

The current invention provides a combination of WFMS technology and trigger technology. The current invention teaches how to map control flows of business process models to ECA rules. The interpretation of the generated ECA rules themselves can be implemented in a variety of ways, e.g. in active database systems, agent systems, or publish/subscribe environments. Consequently, the invention can be deployed for implementing a workflow system based on a multitude of different technologies. The invention provides an approach to model and define business processes completely in terms of and based on WFMS technology; but, on the other hand, open the option to use as a mere implementation environment the technology of trigger systems by automatically generating trigger specifications being directly executable by the trigger system.

Moreover, by proposing an enhanced transformation approach, the current invention is also able to solve the synchronization problem of parallel control paths in the process model in an automated way. Thus, applicability of the suggested teaching is significantly increased as most process models implementing a real life business process have to deal with parallel control paths.

The proposed teaching is also capable of including the specific data flow accompanied by the control flow, for instance via input and output containers, into the automated transformation and generation process of trigger specifications.

Furthermore via an additional termination request, which is also generated during the transformation process as part of the trigger specifications it has become possible to signal the next trigger event transparently to the trigger system. A potential necessity for adaptation of the trigger system for raising the next event has been avoided completely.

Actually implementing the raised events as records in a table (for instance of a database) allows for an effective approach for realization of the materialization logic. The materialization is enabled to operate independent from the trigger specifications in the background taking care for proper materialization of transition condition parameters and input and output containers. In addition, persistence of the status of the various events is guaranteed without further provisions.

What is claimed is:

1. A computerized method in a computer system for said system to take a process-model of a workflow-management-system and, without user input, automatically generate an automatically executable implementation of the business process modeled by the Process-model as trigger-specifications executable within a trigger-system, said process-model comprising at least one source-activity S and a target-activity T and a control-connector defining a potential control flow from said source-activity to said target-activity associated with a transition-condition P, comprising the steps of:

receiving as input a process-model comprising at least one source-activity S and a target-activity T and a control-connector, defining a potential control flow from said source-activity to said target activity associated with a transition-condition P;

automatically transforming said source-activity S into a trigger-event TERMINATE(S), without user input, whereby said trigger-event, if raised at run-time, indicates to said trigger-system that an instance of said source-activity has been terminated;

automatically transforming said control-connector into a trigger-condition, without user input, whereby at run-time, once said trigger-event has been raised, said trigger-system evaluates the truth value of said transition-condition; and automatically transforming said target-activity T into a trigger-action START(T), without user input, whereby at run-time, in case said trigger-condition evaluates to TRUE, said trigger-system starts an instance of said target-activity;

wherein in said process-model said target-activity is a join-activity being the target of at least one further control-connector associated with a further transition-condition P2, said method further comprising:

transforming, if said workflow-management-system defines said target-activity to be started in case either one of said transition-conditions evaluates to TRUE, said control-connector into a trigger-condition by logically ORing said transition-condition and said further transition-condition (P OR P2); and transforming, if said workflow-management-system defines said target-activity to be started in case all of said transition-conditions evaluate to TRUE, said control-connector into a trigger-condition by logically ANDing said transition-condition and said further transition-condition (P AND P2).

2. A computerized method for automatically transforming a process-model according to claim 1 wherein each of said activities within said process-model comprises an input-container and an output-container, said method further comprising:

incorporating accessing means into said trigger-specification whereby at run time said trigger-system accesses the parameters of all of said transition-conditions and said input-containers and said output-containers of said source-activity and said target-activity.

3. A computerized method for automatically transforming a process-model according to claim 2, further comprising incorporating into said trigger-action a termination-request SIGNALTERMINATION(T), whereby said trigger-system responds to said termination-request at run-time by raising a new trigger-event TERMINATE(T) once said instance of said target-activity has been terminated.

4. A computerized method for automatically transforming a process-model according to claim 3, wherein said termination-request comprises a request to store at run-time a termination-record into a table, indicating termination of said instance of said target-activity, said table to be used by said trigger-system at run-time for determining raised trigger-events.

5. A computerized method in a computer system for said system to take a process-model of a workflow-management-system and, without user input, automatically generate an automatically executable implementation of the business process modeled by the process-model as trigger-specifications executable within a trigger-system, said process-model comprising at least one source-activity S and a target-activity T and a control-connector defining a potential control flow from said source-activity to said target-activity associated with a transition-condition P, comprising the steps of:

receiving as input a process-model comprising at least one source-activity S and a target-activity T and a control-connector defining a potential control flow from said source-activity to said target activity associated with a transition-condition P;

automatically transforming said source-activity S into a trigger-event TERMINATE(S), without user input, whereby said trigger-event, if raised at run-time, indicates to said trigger-system that an instance of said source-activity has been terminated;

automatically transforming said control-connector into a trigger-condition, without user input, whereby at run-time, once said trigger-event has been raised, said trigger-system evaluates the truth value of said transition-condition; and automatically transforming said target-activity T into a trigger-action START(T), without user input, whereby at run-time, in case said trigger-condition evaluates to TRUE, said trigger-system starts an instance of said target-activity wherein in said process-model said target-activity is a join-activity being the target of at least one further control-connector associated with a further transition-conditions Pi, and said process-model defining said target-activity to be started in case a Boolean-expression B(P, ..., Pi, ...) based on said transition conditions evaluates to TRUE, said method further comprising transforming said control-connector into a trigger-condition representing said Boolean-expression B(P, ..., Pi, ...).

6. A computerized method for automatically transforming a process-model according to claim 5 wherein each of said activities within said process-model comprising an input-container and an output-container, said method further comprising:

incorporating accessing means into said trigger-specification whereby at run time said trigger-system accesses the parameters of all of said transition-conditions and said input-containers and said output-containers of said source-activity and said target-activity.

7. A computerized method for automatically transforming a process-model according to claim 6, further comprising incorporating into said trigger-action a termination-request SIGNALTERMINATION(T), whereby said trigger-system responds to said termination-request at run-time by raising a new trigger-event TERMINATE(T) once said instance of said target-activity has been terminated.

8. A computerized method for automatically transforming a process-model according to claim 7, wherein said termination-request comprises a request to store at run-time a termination-record into a table, indicating termination of said instance of said target-activity, said table to be used by said trigger-system at run-time for determining raised trigger-events.

9. A system for receiving a process model of a workflow-management-system and for, without user input, automatically generating an automatically executable implementation of the business process modeled by the process-model as trigger-specifications executable within a trigger-system, said process-model comprising at least one source-activity S and a target-activity T and a control-connector defining a potential control flow from said source-activity to said target-activity associated with a transition-condition P comprising:

means for receiving as input a process-model comprising at least one source-activity S and a target-activity T and a control-connector defining a potential control flow from said source-activity to said target activity associated with a transition-condition P;

at least one processing component for automatically transforming said source-activity S into a trigqer-event TERMINATE(S), without user input, whereby said trigger-event, if raised at run-time, indicates to said trigger-system that an instance of said source-activity has been terminated;

at least one processing component for automatically transforming said control-connector into a trigger-condition, without user input, whereby at run-time, once said trigger-event has been raised, said trigger-system evaluates the truth value of said transition-condition; and at least one processing component for automatically transforming said target-activity T into a trigger-action START(T), without user input, whereby at run-time, in case said trigger-condition evaluates to TRUE, said trigger-system starts an instance of said target-activity, wherein in said Process-model said target-activity is a loin-activity being the target of at least one further control-connector associated with a further transition-condition P2, and wherein said at least one Processing component for automatically transforming said control connector comprises:

means for transforming, if said workflow-management-system defines said target-activity to be started in case either one of said transition-conditions evaluates to TRUE, said control-connector into a trigger-condition by logically ORing said transition-condition and said further transition-condition (P OR P2); and if said workflow-management-system defines said target-activity to be started in case all of said transition-conditions evaluate to TRUE, said control-connector into a trigger-condition by logically ANDing said transition-condition and said further transition-condition (P AND P2).

10. A data processing program for execution in a data processing system comprising software code portions for performing a method in a computer system for said system to take a process-model of a workflow-management-system and, without user input, automatically generate an automatically executable implementation of the business method modeled by the process-model as trigger-specifications executable within a trigger-system, said process-model comprising at least one source-activity S and a target-activity T and a control-connector defining a potential control flow from said source-activity to said target-activity associated with a transition-condition P, said method comprising the steps of:

receiving as input a process-model comprising at least one source-activity S and a target-activity T and a control-connector defining a potential control flow from said source-activity to said target activity associated with a transition-condition P;

automatically transforming said source-activity S into a trigger-event TERMINATE(S), without user input, whereby said trigger-event, if raised at run-time, indicates to said trigger-system that an instance of said source-activity has been terminated;

automatically transforming said control-connector into a trigger-condition, without user input, whereby at run-time, once said trigger-event has been raised, said trigger-system evaluates the truth value of said transition-condition; and automatically transforming said target-activity T into a trigger-action START(T), without user input, whereby at run-time, in case said trigger-condition evaluates to TRUE, said trigger-system starts an instance of said target-activity, wherein in said process-model said target-activity is a join-activity being the target of at least one further control-connector associated with a further transition-condition P2, said method further comprising:

transforming, if said workflow-management-system defines said target-activity to be started in case either one of said transition-conditions evaluates to TRUE, said control-connector into a trigger-condition by logically ORing said transition-condition and said further transition-condition (P OR P2); and transforming, if said workflow-management-system defines said target-activity to be started in case all of said transition-conditions evaluate to TRUE, said control-connector into a trigger-condition by logically ANDing said transition-condition and said further transition-condition (P AND P2).

11. A computer program product stored on a computer usable medium, comprising computer readable program means for causing a computer to perform a method in a computer system for said system to take a process-model of a workflow-management-system and, without user input, automatically generate an automatically executable implementation of the business process modeled by the process-model as trigger-specifications executable within a trigger-system, said process-model comprising at least one source-activity S and a target-activity T and a control-connector defining a potential control flow from said source-activity to said target-activity associated with a transition-condition P, said method comprising the steps of:

receiving as input a process-model comprising at least one source-activity S and a target-activity T and a control-connector defining a potential control flow from said source-activity to said target activity associated with a transition-condition P;

automatically transforming said source-activity S into a trigger-event TERMINATE(S), without user input, whereby said trigger-event, if raised at run-time, indicates to said trigger-system that an instance of said source-activity has been terminated;

automatically transforming said control-connector into a trigger-condition, without user input, whereby at run-time, once said trigger-event has been raised, said trigger-system evaluates the truth value of said transition-condition; and automatically transforming said target-activity T into a trigger-action START(T), without user input, whereby at run-time, in case said trigger-condition evaluates to TRUE, said trigger-system starts an instance of said target-activity, wherein in said process-model said target-activity is a join-activity being the target of at least one further control-connector associated with a further transition-condition P2, said method further comprising:

transforming, if said workflow-management-system defines said target-activity to be started in case either one of said transition-conditions evaluates to TRUE, said control-connector into a trigger-condition by logically ORing said transition-condition and said further transition-condition (P OR P2); and transforming, if said workflow-management-system defines said target-activity to be started in case all of said transition-conditions evaluate to TRUE, said control-connector into a trigger-condition by logically ANDing said transition-condition and said further transition-condition (P AND P2).

12. A system for receiving a process model of a workflow-management-system and for, without user input, automatically generating an automatically executable implementation of the business process modeled by the process-model as trigger-specifications executable within a trigger-system, said process-model comprising at least one source-activity S and a target-activity T and a control-connector defining a potential control flow from said source-activity to said target-activity associated with a transition-condition P comprising:

means for receiving as input a process-model comprising at least one source-activity S and a target-activity T and a control-connector defining a potential control flow from said source-activity to said target activity associated with a transition-condition P;

at least one processing component for automatically transforming said source-activity S into a trigger-event TERMINATE(S), without user input, whereby said trigger-event, if raised at run-time, indicates to said trigger-system that an instance of said source-activity has been terminated;

at least one processing component for automatically transforming said control-connector into a trigger-condition, without user input, whereby at run-time, once said trigger-event has been raised, said trigger-system evaluates the truth value of said transition-condition; and at least one processing component for automatically transforming said target-activity T into a trigger-action START(T), without user input, whereby at run-time, in case said trigger-condition evaluates to TRUE, said trigger-system starts an instance of said target-activity, wherein in said process-model said target-activity is a join-activity being the target of at least one further control-connector associated with a further transition-conditions Pi, and said Process-model defining said target-activity to be started in case a Boolean-expression B(P, ..., Pi, ...) based on said transition conditions evaluates to TRUE, wherein said at least one processing component for automatically transforming said control-connector comprises means for transforming said control-connector into a trigger-condition representing said Boolean-expression B(P, ..., Pi, ...).

13. A data processing program for execution in a data processing system comprising software code portions for performing a method in a computer system for said system to take a process-model of a workflow-management-system and, without user input, automatically generate into an automatically executable implementation of the business method modeled by the process-model as trigger-specifications executable within a trigger-system, said process-model comprising at least one source-activity S and a target-activity T and a control-connector defining a potential control flow from said source-activity to said target-activity associated with a transition-condition P, said method comprising the steps of:

receiving as input a process-model comprising at least one source-activity S and a target-activity T and a control-connector defining a potential control flow from said source-activity to said target activity associated with a transition-condition P;

automatically transforming said source-activity S into a trigger-event TERMINATE(S), without user input, whereby said trigger-event, if raised at run-time, indicates to said trigger-system that an instance of said source-activity has been terminated;

automatically transforming said control-connector into a trigger-condition, without user input, whereby at run-time, once said trigger-event has been raised, said trigger-system evaluates the truth value of said transition-condition; and automatically transforming said target-activity T into a trigger-action START(T), without user input, whereby at run-time, in case said trigger-condition evaluates to TRUE, said trigger-system starts an instance of said target-activity, wherein in said process-model said target-activity is a join-activity being the target of at least one further control-connector associated with a further transition-conditions Pi, and said process-model defining said target-activity to be started in case a Boolean-expression B(P, ..., Pi, ...) based on said transition conditions evaluates to TRUE, said method further comprising transforming said control-connector into a trigger-condition representing said Boolean-expression B(P, ..., Pi, ...).

14. A computer program product stored on a computer usable medium, comprising computer readable program means for causing a computer to perform a method in a computer system for said system to take a process-model of a workflow-management-system and, without user input, automatically generate an automatically executable implementation of the business process modeled by the process-model as trigger-specifications executable within a trigger-system, said process-model comprising at least one source-activity S and a target-activity T and a control-connector defining a potential control flow from said source-activity to said target-activity associated with a transition-condition P, said method comprising the steps of:

receiving as input a process-model comprising at least one source-activity S and a target-activity T and a control-connector defining a potential control flow from said source-activity to said target activity associated with a transition-condition P;

automatically transforming said source-activity S into a trigger-event TERMINATE(S), without user input, whereby said trigger-event, if raised at run-time, indicates to said trigger-system that an instance of said source-activity has been terminated;

automatically transforming said control-connector into a trigger-condition, without user input, whereby at run-time, once said trigger-event has been raised, said trigger-system evaluates the truth value of said transition-condition; and automatically transforming said target-activity T into a trigger-action START(T), without user input, whereby at run-time, in case said trigger-condition evaluates to TRUE, said trigger-system starts an instance of said target-activity, wherein in said process-model said target-activity is a loin-activity being the target of at least one further control-connector associated with a further transition-conditions Pi, and said process-model defining said target-activity to be started in case a Boolean-expression B(P, ..., Pi, ...) based on said transition conditions evaluates to TRUE, said method further comprising transforming said control-connector into a trigger-condition representing said Boolean-expression B(P, ..., Pi, ...).

* * * * *